United States Patent [19]

Davis et al.

[11] 4,038,191
[45] July 26, 1977

[54] MANIFOLD FOR ULTRA FILTRATION MACHINE

[76] Inventors: Harold R. Davis; Christopher A. Brockley; Geoffrey V. Parkinson, all c/o Mechanical Engineering Dept., University of British Columbia; John D. E. Price, c/o Faculty of Medicine, University of British Columbia all of Vancouver, British Columbia, Canada

[21] Appl. No.: 622,418

[22] Filed: Oct. 14, 1975

[51] Int. Cl.² ............................................. B01D 31/00
[52] U.S. Cl. ............................... 210/321 B; 210/137; 210/456; 239/566
[58] Field of Search ............ 210/321 A, 321 B, 321 R, 210/456, 137; 55/158, 159; 239/556–567; 128/DIG. 3; 23/258.5 B, 258.5 R, 258.5 M

[56] References Cited

U.S. PATENT DOCUMENTS

| | | | |
|---|---|---|---|
| 1,830,393 | 11/1931 | Geurink et al. | 239/566 X |
| 2,573,144 | 10/1951 | Jaye | 239/566 |
| 3,412,940 | 11/1968 | Ferroli | 239/566 X |
| 3,434,522 | 3/1969 | Lauventy | 239/566 X |
| 3,778,369 | 12/1973 | Markley | 210/321 B |

*Primary Examiner*—Frank A. Spear, Jr.
*Assistant Examiner*—E. Rollins Cross
*Attorney, Agent, or Firm*—Cushman, Darby & Cushman

[57] ABSTRACT

A header unit designed for use in a blood dialysis device, providing laminar flow conditions with no regions or stagnation or turbulence which could cause blood hemolysis. The specification discloses a diffuser adapted to provide uniform and nontraumatic diversion and diffusion of blood from a blood supply tube having a given cross-section area to a treatment face of a dialysis device in which said treatment face is of larger surface area than said supply tube. The diffuser comprises a first diffuser section of pipe continuous with the supply tube, flow turning vanes, and a second diffuser section leading to the liquid treatment face. The first diffuser section has a cross-section which reduces smoothly and progressively as the liquid flow passage proceeds from an inlet of the first diffuser section to an end thereof, said first diffuser section being open on the side away from the curvature and supplying liquid in a direction perpendicular to the direction of liquid flow in the supply tube, to an inlet of the second diffuser section. The second diffuser section comprises a compartment having a liquid flow space, the height of said compartment perpendicular to the treatment face diminishing continuously from an inlet of said second section diffuser inlet face to the distal side of the second diffuser section. There is provided a multiplicity of flow turning vanes associated with the interface between the first diffuser section tube and the second diffuser section compartment, generally located in a straight transition section.

16 Claims, 10 Drawing Figures

Fig-7

MANIFOLD FOR ULTRA FILTRATION MACHINE

DISCLOSURE

This invention relates to a header unit designed for use in blood dialysis device, providing laminar flow conditions with no regions of stagnation or turbulence which could cause blood hemolysis.

BACKGROUND OF THE INVENTION

The artificial kidney has been accepted as a major advance in maintaining the lives of people suffering from irreversible kidney failure. It is also used as an interim support system for patients suitable for kidney transplantation. Hemodialysis is a successful long-term life support method so that the people requiring treatment increase each year at a rate approximately 35 per million population.

Existing forms of artificial kidneys that are used clinically demonstrate problems in many areas primarily in efficiency, compatibility with the patient, and cost of use. These types of problems are amenable to solution by engineering analysis and techniques. Collaboration between the Renal Unit of the Vancouver General Hospital and the Mechanical Engineering Department at The University of British Columbia in 1966 sponsored by both MRC and NRC grants resulted in a Ph.D. by H. R. Davis entitled "The Design of a Capillary Artificial Kidney", Ph.D. Thesis, The University of British Columbia, Canada, wherein a new concept for a hemodialyzer configuration was developed. This thesis stated a theory for mass transfer of impurities from blood to dialysate through a capillary membrane and optimized the transfer process. An important part of the thesis dealt with the fluid mechanics of the blood circuit in the dialyzer by a novel method of distributing blood from the feeder lines to the capillaries.

Construction of a number of prototype capillary artificial kidneys was commenced in order to provide experimental verification of the design given in the Ph.D. thesis. Tests were performed with physiological saline solutions, with blood from the hospital blood bank, and on dogs under simulated kidney disease conditions. The prototype kidneys were constructed with either cellulose or plastic capillaries as these were the only useful fibres that could be obtained for experimental use. Several months of testing under various conditions conclusively demonstrated that the prototype artificial kidney with plastic capillaries met the original design constraints and could achieve a level of operating efficiency and blood compatibility unmatched by any other existing system, as shown in the article by the present inventors Price, J. D. E., Davis, H. R., Parkinson, G. V., and Brockley, C. A.; "A New Capillary Hemodialyzer", Ann. Roy. Coll. Phy. and Surg. 6:1, p. 40, Jan., 1973.

Work has been conducted on the manifolds used to distribute blood from a single feeder line to many thousands of capillaries. The design of this new manifold configuration followed the criteria set out for the earlier manifold described in the thesis by David (supra). The object of this work was to achieve a design which would allow an artificial kidney containing more than 10,000 capillaries to have uniform blood distribution with only one arterial and venous manifold.

The successful design should maintain laminar blood flow everywhere in the manifold, distribute blood uniformly to every capillary, have no regions of stagnation where thrombus formation could occur, have a minimum internal volume to conserve the patients blood, and be non-traumatic towards blood. These conditions were met by forming a compound manifold. That is, a primary manifold (which used a linear area decrease cross-section in the downstream direction) fed fluid to a secondary manifold (also a linear area decrease cross-section) which fed fluid to the capillaries. An important element of the design is the provision of turning vanes between the primary and secondary manifold sections.

The design of a manifold for capillary artificial kidneys that meets the physiological requirements of blood transport while achieving uniform fluid distribution has been accomplished. Flow visualization showed that laminar fluid flow existed everywhere in the header and thus thrombus formation probably would not be accelerated. The physical shape of the manifold is convenient for construction purposes and achieves the goal of low internal blood volume. Experimental work with blood demonstrated that clotting in the headers and capillaries is not a problem, provided that non-thrombogenic materials are used.

DISCUSSION OF THE PRIOR ART

It is essential to have a particularly well-defined fluid geometry for the blood circuit in a hemodialyzer for two reasons. Firstly, the mass transfer of impurities from blood to dialysate depends upon the fluid distribution and secondly, the blood clotting mechanism has been demonstrated to be very dependent on the fluid dynamics of the blood circuit. The capillary artificial kidney is a basic configuration which allows good control over the fluid flow geometry and thus offers a unit which will meet the operating requirements of a hemodialyzer.

The capillary hemodialyzer consists of a large number of small diameter capillaries connected in parallel through which blood must flow uniformly. A method of distributing blood to each capillary is of primary concern and is accomplished by means of a device called a manifold or header.

Clotting of blood and the deposit of fibrin on blood-contacting surfaces has been a major problem in all artificial kidneys both on the headers and on the membranes. This clotting mechanism has been found to be accelerated if there are stagnant regions in the blood circuit or if there are regions of high shear rates, such as in turbulent flow or flow separation. The deposit of fibrin depends on the blood volume-to-surface ratio and the residence time in contact with blood contacting surfaces also affect greatly the observed reaction.

With these factors in mind it is possible to stipulate some criteria to be applied in the design of the blood flow circuit. The flow must be laminar everywhere with no regions of stagnation or separation and the fluid distribution must provide every capillary with an equal flow rate. As well, the blood volume-to-surface ratio must be a maximum in the header for flow amounts of fibrin deposition and a minimum in the capillaries for good mass transfer and yet the total blood volume in the dialyzer should be as small as is feasible.

These somewhat contradictory conditions to the fluid mechanics of the artificial kidney have had varius solutions in past years. The most common configuration has been a potted circular bundle of capillaries arranged so that the inlet to the capillaries is a flat surface normal to the bundle. Blood is introduced to this surface, the "manifold sheet', by means of a header which in previous designs has failed to meet at least two of the specified criteria by having either stagnation regions, flow separation, or poor distribution. The reader is referred to Markley—Hemodialyzer with tapered slit blood parts and baffles" Canadian Pat. No. 961,775 issued Jan. 28, 1975.

As an alternative method of solving the manifold problem, it was proposed that the header be oriented at right angles to the "manifold sheet" which would have a rectangular section instead of being a circular bundle of capillaries. The shape of the header would be determined to eliminate regions of stagnation and to provide uniform fluid flow to all capillaries. This configuration would allow a large number of capillaries to receive blood from a header that has a small internal volume.

There are many variables present in the proposed header design. Some of these include the basic header configuration and cross-sectional shape, the header diameter and length, and the dimensions of the capillary bundle. Some of these variables are inter-related and can be expressed as dimensionless parameters such as the capillary bundle "aspect ratio" which is the length to width ratio, and the "obstruction ratio" which is the ratio of the width of the capillary bundle to the header inlet diameter.

The present invention therefore provides a diffuser adapted to provide uniform diversion and diffusion, with laminar flow, of liquid from a liquid supply tube having a given cross-section area to a liquid treatment face of a device in which said treatment face is of larger surface area than said supply tube;

said diffuser comprising a first diffuser section of tube continuous with the supply tube, flow turning vanes, and a second diffuser section leading to the liquid treatment face, said first diffuser section having a cross-section which reduces smoothly and progressively as the liquid flow passage proceeds from an inlet of the first diffuser section to an end thereof, said first diffuser section being open on the side away from the curvature and supplying liquid in a direction perpendicular to the direction of liquid flow in the supply tube, to an inlet of of the second diffuser.

said second diffuser section comprising a compartment having a liquid flow space, the height of said compartment perpendicular to the treatment face diminishing continuously from an inlet of said second diffuser to the distal side of the second diffuser section, and a multiplicity of flow turning vanes associated with the interface between the first diffuser section tube and the second diffuser section compartment, generally located in a straight transition section.

In one embodiment the invention provides such a diffuser adapted for non-traumatic flow in a blood diffusion apparatus, wherein the liquid supply pipe is of circular cross-section and the liquid treatment face is the inlet area of a capillary diffusion unit having a rectangular cross-section. In general, the first diffuser section has a cross-section which reduces smoothly and progressively from a circular cross-section at the beginning of the diffuser section to a flattened semi-circular cross-section at the point at which the pipe merges with the end of the liquid supply opening on said pipe.

BRIEF DESCRIPTION OF THE DRAWINGS

In the drawings which accompany this specification.

DETAILED DESCRIPTION OF THE INVENTION

The cross-sectional shape of the inlet pipe or "header" is normally basically circular. In a preferred embodiment the area of the header will decrease as fluid moves downstream from the inlet. At a point in the header length where its diameter is equal to the capillary bundle width, the cross-sectional shape is changed to semi-elliptical with the major axis of the ellipse equalling the capillary bundle width.

ANALYSIS

The profile of the header was calculated theoretically after specifying the basic cross-sectional shape. This was accomplished by solving the one-dimensional energy and continuity equations for fluid flow in the header. In reality, the fluid mechanics of the header is a complex three-dimensional problem but for a first approximation the one-dimensional form may be used. In essence, these equations predicted that for a manifold in which the pressure drop in its length is small compared to the pressure loss in the capillary outflow region, the cross-sectional area should decrease in a linear manner with manifold length.

$$A(x) = A_o(1 - (X/L)) \quad (1)$$

In this equation $A_o$ is the header inlet area, $L$ is the capillary bundle length, and $x$ is the distance downstream from the header inlet. The header area at any given length is the true fluid area where the area lost due to the capillary bundle or turning vane intrusion has been subtracted. This simple equation is valid for values of the obstruction ratio much less than unity and for values of the aspect ratio much greater than unity.

EXPERIMENTS ON MANIFOLDS (FIRST DIFFUSER SECTION)

Figure 1:
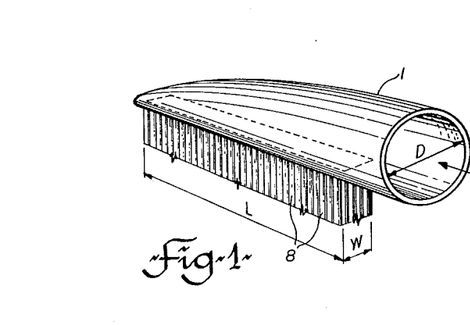
FIG. 1 is a perspective schematic view showing some parameters mentioned in the specification.

A series of experiments was performed on various configurations of headers such as shown in FIG. 1, in order to provide some evidence of flow conditions in existing manifolds and to check the theoretical prediction of the correct primary header shape. Measurement of the pressure distribution in the header 1 correlated to the fluid distribution in the capillaries 8, as a uniform pressure throughout the manifold resulted in equal flow rates through identical capillaries connected in parallel to the header. Dye streak injection upstream of the manifold allowed the fluid streamlines in the header to be visualized under steady flow conditions. The dye streaks indicated regions of stagnation and turbulence.

Distilled water was used as a test fluid and transparent manifolds permitted flow visualization.

Figure 2:
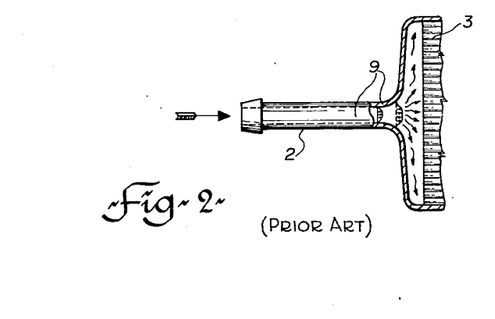
FIGS. 2 and 3 describe the turbulent and non-streamline flow occurring in prior art devices.

The first manifold studies was of the configuration common to prior art existing capillary dialyzers as shown in FIG. 2. In this form the circular inlet section 2 expands in area downstream from the inlet until the header diameter is equal to the diameter of the capillary bundle 3. The header profile generally follows an exponential increase in diameter with length. Under fluid visualization, the flow in this manifold separated from the header walls 9 nearly immediately after the inlet and formed pronounced turbulence and mixing. The velocity profile across the header indicates higher blood flow in the central area of the capillary bundle. The fluid velocity profile in this manifold is demonstrated in FIG. 2 which shows the longitudinal cross-section through the header.

Figure 3:
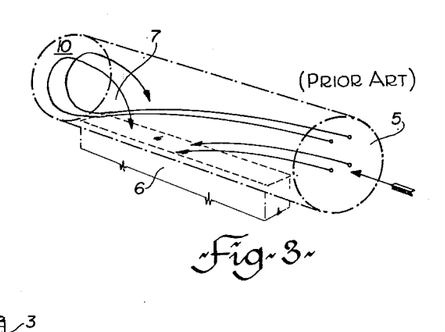

FIG. 3 shows the second manifold studied, which was based on the cylindrical configuration common to the headers used on flat-plate dialyzers such as the KIIL Dialyzer, (Trade Mark). In this form the non-tapering circular cross-section 5 has a rectangular outflow region 6 similar to the proposed header configuration. However, dialyzers such as the KIIL, do not have capillaries in the outflow region of the manifold and thus lose the advantages of the turning effect of these capillaries. Therefore, fluid distribution for manifolds similar to the KIIL is not good. The model tested had an aspect ratio of 10 and an obstruction ratio of 0.5 Pressure measurements along the header indicated that uniform flow to the capillaries was realized except at the downstream region 7 near the end 10 of the manifold where there was a substantial pressure rise. Dye streak studies demonstrated that this manifold had a large stagnation area and even reverse fluid flow in the downstream high pressure region as shown by arrows in FIG. 3.

Figure 4:
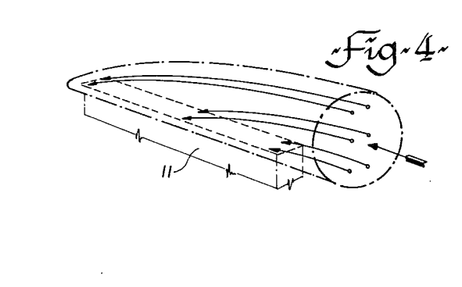
FIG. 4 shows streamline flow in a part of the present invention.

In FIG. 4 is shown the third manifold studied, which was based on the predicted theoretical configuration of a linear decrease in cross-sectional area with manifold length. The rectangular outflow region 11 to the capillary bundle was tested in two forms, one with an obstruction ratio of 0.25 and another with an obstruction ratio of 0.5 but both with an aspect ratio of 10. Pressure measurements along the manifold showed that very uniform flow to the capillaries was present for either outflow configuration. Dye streak investigation demonstrated that laminar fluid flow was present everywhere in the header and that no regions of appreciable stagnation existed. The streamlines are shown by arrows in FIG. 4.

EXPERIMENTS

An experimental program was initiated to test the predicted manifold configuration for haematological compatibility. A number of headers were cast in Dow Corning "Silastic" RTV (Trade Mark), rubber around a mold based on the shape determined by equation (1) where the inlet diameter was ¼ in. (6 mm) and the outflow region had dimensions ⅛ in. by 1¼ in. Silastic is a synthetic rubber containing organo silicon polymers. Cellulose diacetate capillaries were potted in Silastic RTV (Trade Mark) to the required dimensions and a header was attached to either end of the capillary bundle. The resulting blood circuit contained approximately 1600 capillaries with an active length of 2 ½ in. (64 mm). Blood feeder lines were attached to the headers and the entire assembly was placed in a "Plexiglas" (Trade Mark) dialysate chamber. Plexiglas is thermoplastic poly(methyl)methacrylate polymer. The prototype hemodialyzer had 3.2 ml blood volume in the capillaries with approximately 3 ml in the headers and had an effective membrane area of 540 $cm^2$.

The first experiments consists of mass transfer determinations for creatinine and sodium chloride using distilled water in the blood and dialysate circuits. Nominally the units had an overall mass transfer resistance of 50 min/cm for sodium chloride at 20° C for flow rates up to 30 ml/min.

Next, "in-vitro" experiments with human blood were performed where clearances for urea, creatinine and phosphate were determined while the blood clotting properties of the unit were studies. The mass transfer resistance was higher than desirable but this could be attributed to the poor permeability of the membrane, as approximately 30% of the mass transfer resistance occurred in the blood film while 70% occurred in the membrane wall. The pressure drop across the dialyzer was monitored for all blood flow rates because an increase in pressure drop during an experimental run indicated progressive clotting in the capillaries for a constant blood flow rate. Generally, the pressure drop across the prototype dialyzer increased continuously with length of time of blood flow. When the unit was rinsed clean of blood and reused, the initial pressure drop was approximately 10% higher than the first run. Upon dissection of the blood circuits no obvious clots or fibrin deposits were noted in the headers but extensive clotting appeared in the cellulose capillaries.

Another series of experiments was performed "in-vivo" on dogs. The experimental protocol consisted of using the prototype dialyzers on heparinized dogs which had artificially lower hemotocrits but were not nephrectomized. Continuous infusion of urea and creatinine provided a constant impurity load in the animal. Blood pressure and flow rate were monitored while blood samples were taken during the run on the dialyzer. It was found that the protoype dialyzers had an initial overall mass transfer resistance of 50 min/cm for urea and 60 min/cm for creatinine which rose to 100 min/cm and 135 min/cm for urea and creatinine respectively at the termination of the dialysis procedure. The differential pressure across the unit also increased with time which indicated progressive clotting. A pathologic examination of the blood circuits indicated, as in the "in-vitro" studies, that the clotting occurred in the capillary outflow region growing back into the fibres. The manifolds were clear of clots or fibrin deposits. The free plasma hemoglobin level in the dog did not rise during the experimental procedure which would indicate that the dialyzer did not appreciably hemolyze blood.

The last series of experiments using the primary manifold were conducted on artificial kidney units constructed with proprietary plastic capillaries. The basic kidney consisted of 700 capillaries potted with Silastic RTV (Trade Mark) into the same headers used previously with active lengths of 2 ½ in. and 5 ½ in. (64 mm and 140 mm) to give effective membrane areas of 330 $cm^2$ and 625 $cm^2$ respectively.

A series of experiments was performed 'in-vivo' on dogs, using the same experimental protocol as before. It was found that for the six kidney units tested, the overall mass transfer resistance remained constant between 30 min/cm and 50 min/cm for both urea and creatinine even when the same unit was reused many times. A typical experiment consisted of a four-hour run on a dog with the unit being flushed with heparinized saline to clear the blood, washed with sodium hypochlorite to remove any free fibrin, and filled with 3% formalin for sterile storage at the end of the run. The unit could then be re-used at a later date by flushing out the formalin with a saline solution. This procedure was followed for the plastic capillary units and allowed up to ten re-uses before a significant deterioration in performance was observed.

The differential pressure across the units was monitored during this experimental series. Because of the variations in blood viscosity from one animal to another animal, it was necessary to correct the differential pressures for blood viscosity in order to have a meaningful measurement of the number of capillaries which had clotted. These reduced differential pressures remained constant during an experiment and from one re-use to the next with up to ten re-uses before significant differential pressure increases were noticed.

As well, the plastic artificial kidney units were examined for evidence for clotted capillaries and blood clot formation in the manifolds. There was insignificant clotting in the manifolds during the experiments and the number of capillaries which had clotted increased slowly as the units were re-used (about 1% loss due to blood clots per run). There was no increase in plasma hemoglobin through the unit during the experiments.

All experimental evidence obtained from the cellulose and plastic capillary artificial kidneys which used the primary manifold indicated that there was good blood distribution with no trauma to the blood which would cause clotting. The cellulose capillaries were not blood compatible and deteriorated during use. Plastic capillaries, on the other hand, allowed multiple re-use of the units. One plastic capillary kidney was used for a total of six times on a human uremic patient without evidence of any unfavourable reaction.

DETAILED DESCRIPTION OF THE HEADER

Figure 7:
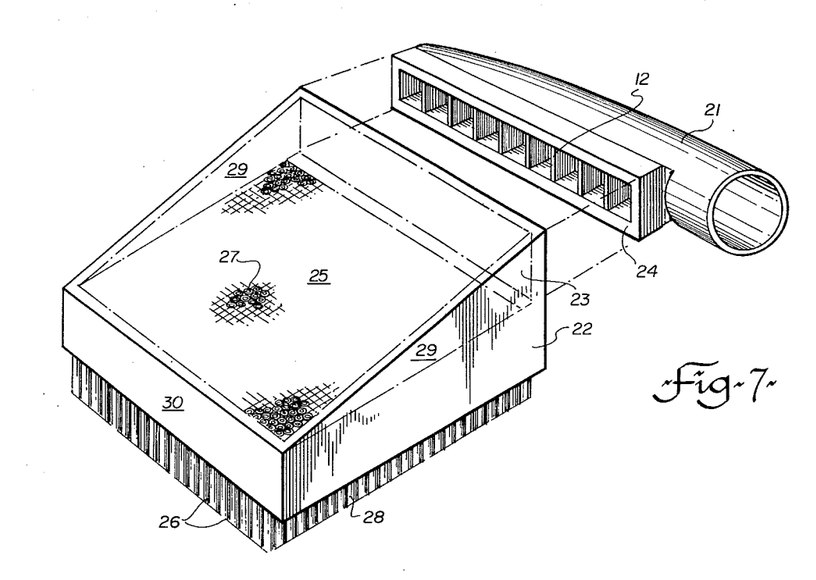
FIG. 7 shows an exploded view showing a first diffuser section flow turning vanes, second diffuser section and capillary bundle.

Expansion of fluid from a small area conduit to a larger area conduit requires a diffuser which reduces the velocity of the fluid. Practically, the outlet flow uniformity in such a diffuser is limited by the tendency for gross flow separation from the diffuser walls caused by fluid frictional processes. As shown in FIG. 7, this tendency for separation can be controlled by turning the fluid through an angle while expanding the flow in multiple channels formed by turning vanes 12. The turning vanes can be either discrete structural elements in the diffuser or be integral with the multiple-conduit outlet itself but in either case the multiple channels formed by the turning vanes will have small dimensions compared to the diffuser.

Figures 5, 6, 8:
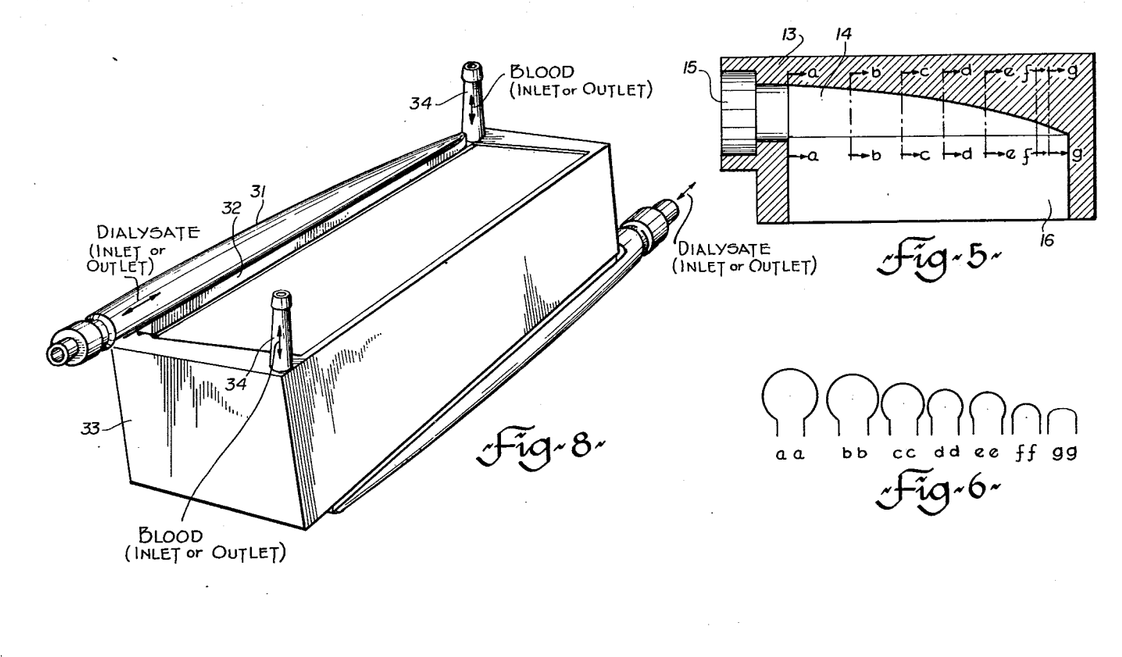
FIG. 5 shows section view of a diffuser section.
FIG. 6 shows schematically the cross-section of the inlet pipe shown in FIG. 5.
FIG. 8 shows a perspective view of a complete dialysis device incorporating the present invention. (This figure is found on the drawing sheet bearing FIGS. 5 and 6.)

As seen in FIGS. 5 and 6, uniform flow distribution from the diffuser is accomplished by using an inlet conduit 13 in which the circular cross-section area 14 decreases linearly from the entrance 15 which feeds fluid to a rectangular outflow area 16 in whichare located the turning vanes (not shown in the drawings). The circular cross-section is necessary to avoid secondary flow.

Best performance of the manifold occurs when the rectangular outflow region has an aspect ratio of approximately 10 while the narrow dimension is equal to one-half the diameter of the inlet conduit. These dimensional constraints allow only a limited expansion of area from the inlet of the diffuser to the outlet (approximately $A_o/A_i = 3$).

A greater expansion of area for the manifold can be obtained by means of a compound design as shown in FIG. 7. The first diffuser 21 can feed a second diffuser 22. The inlet 23 to the second diffuser 22 is the rectangular outflow region 24 of the first diffuser 21. The rectangular shape allows the second diffuser to achieve a large expansion of area between the inlet 23 and the outlet 25 when the outlet is also rectangular and oriented at right angles to the inlet (approximately $A_o/A_i = 10$ if the outlet is square). Thus the compound diffuser yields an area expansion of up to 30 while maintaining stable, laminar flow. The outlet 15 of the second diffuser would most commonly contain the small dimension multiple-conduits or capillaries 26. The cross-sectional area of the second diffuser decreases linearly from the entrance similar to the first diffuser.

In a preferred embodiment the first diffuser will have a circular cross-section at the inlet which changes to a circular cross-section with a chord removed until the point at which the width of the circular cross-section equals the outflow region width. Here the cross-section changes roughly to elliptical or flattened elliptical, with the major diameter equal to the outflow region width.

The turning vanes 12 in the first diffuser 21 will be placed so as the form the chord in the circular cross-section with their upper surfaces. The Turning vanes should consist of a number of identical pieces which have a length at least as long as the spacing between the pieces and should be spaced no further apart than the width of the outflow slot. The most simple configuration for the turning vanes are straight sided segments inserted normal to the outflow slot and spaced equally with square-cut ends. For correct operation the turning vanes must be as thin as practicable depending on the construction method, and in any case, the turning vanes must not occupy a significant percentage of the outflow area.

Because the turning vanes 12 require length in the outflow region 24 of the first diffuser 21, there will be a linear transition section between the first and second diffusers.

The second diffuser 22 will consist of straight surfaces from the rectangular entrance 23 to the normally located square outlet region 25. The outflow region 28 will contain the multiple-conduits 26 to which fluid is being uniformly distributed. The multiple-conduit surface 27 will be flat. There is thus a flow channel formed by a tapered top surface and straight, parallel sides 29 which lead from the rectangular inlet area 23 to the end surface 30 of the second diffuser. The entire compound diffuser has a continuous, smooth surface exposed to fluid, including the turning vanes 12. The unit must be sealed against end leaks.

Examination of fluid motion within the compound manifold has generally indicated no regions where fluid is stagnant, and, with laminar bulk flow, little or no regions of separation or turbulence. At the same time, fluid is conducted from a circular inlet conduit to multiple outlet conduits so that uniform flow distribution is realized.

The turning vanes can have alternate configurations which yield the same result of providing smooth, uniform distribution of fluid. The first variation is that the vanes describe rectangular or square cells within the rectangular outflow area of the first diffuser. There will normally be at least ten cells but there could be as many as one hundred or more. Generally, better fluid distribution results from more cells. The spacing between the vanes should preferably be no greater than the width of the outflow slot in the first diffuser section. The cells may also be hexagonal in shape with straight sides.

Alternatively, the turning vanes can be curved so as to follow the desired fluid streamline path. Again, there must be a sufficient number of vanes to provide uniform fluid distribution.

The rectangular outflow region of the first diffuser can be varied over a considerable dimensional range without adversely affecting its performance. The narrow dimension of the outflow region of the primary manifold can vary in width from extremely small up to one-half of the diameter of the inlet conduit. If the width is greater than one-half the inlet diameter, poor lateral distribution of fluid results. If this outflow region width is very small then sufficient flow resistance exists in the slot to provide uniform longitudinal distribution of fluid without the addition of turning vanes. The length of the outflow region can vary from unity to as much as twenty times the diameter of the inlet conduit but preferably from five to ten times the inlet diameter. For longer outflow slots, fluid resistance within the tapered manifold yields poor longitudinal fluid distribution.

Practical considerations and the requirements of the diffuser design suggest the desirability of providing turning vanes located in an outflow slot which is one-half the inlet conduit diameter and between five and ten times its length, as shown in FIG. 7.

DIALYSATE CASE DESCRIPTION

The dialysate case is an enclosed chamber which contains the capillary bundle and locates the blood manifolds to provide a continuous fluid circuit through the capillaries. The dialysate case also distributes dialysate uniformly to all external surfaces of the capillaries so as to provide efficient mass transfer from the capillary bundle.

The case must provide turbulent dialysate flow, uniform dialysate distribution, effective blood-dialysate seal, and small package volume.

One purpose of the dialysate case is to achieve turbulent and uniform fluid flow over the exterior surfaces of the capillaries. The capillaries are bundled together in a rectangular cross-section configuration governed by the blood manifold outflow shape. Thus dialysate must permeate a rectangular capillary bundle uniformly. This can be accomplished by arranging the dialysate flow to be normal to the capillary axis and by having the flow direction diagonally across the capillary bundle. The diagonal direction assures uniform distribution and the cross-flow configuration assures an efficient fluid geometry for mass transfer.

Uniform longitudinal dialysate distribution can be achieved by employing a manifold to distribute dialysate along the capillary bundle normal to the capillaries. The dialysate manifold can be of the same design as that used for the first diffuser of the blood manifold. An example of this design, shown in FIG. 8, consisted of a circular cross-section conduit 31 at the inlet in which the cross-section area decreased linearily along the length of the manifold. Fluid outflow occured through the rectangular slot 32 which contained turning vanes to assist in maintaining uniform longitudinal distribution. The same dimensional restrictions given for the blood manifold apply to the dialysate manifold except that the outflow region can have an aspect ratio greater than ten without greatly reducing performance.

The capillaries in the capillary bundle are joined together at either end by means of a potting agent. The potting agent seals the capillaries into a block which is cut to expose the capillaries to the blood manifold. The dialysate case 33, which surrounds the capillary bundles, is sealed to the ends of the bundle by means of the potting agent while, at the same time, the dialysate case seals the blood manifolds 34 to the capillary bundle so as to provide a leak-free circuit for blood through the manifolds to the capillaries. The seals must withstand both positive and negative pressures.

Figure 9:
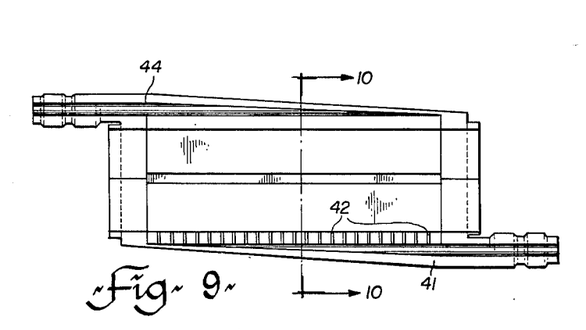
FIG. 9 shows a segment of the dialysate case.

FIG. 9 shows a segment of another embodiment of the dialysate case. Two such segments are designed to be joined together along the diagonal, to form a watertight compartment. Each case segment is half of the dialysate inlet pipe, being contoured to form a dialysate manifold. On each case segment, one manifold part 41 is provided with turning vanes 42 for distribution of the dialysate throughout the dialysis capillary bundle (not shown in the drawings). Another manifold part 44 is contoured to match with manifold 41 and vanes 42. In this embodiment there are 23 vanes equally spaced along the dialysate inlet and outlet. The vanes have a thickness of about 1/32 inch.

Figure 10:
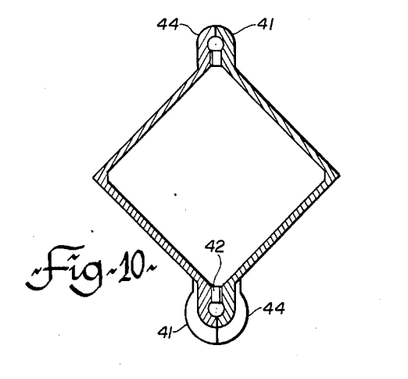
FIG. 10 is a section view showing two case parts of FIG. 9 closed in operating position.

In FIG. 10, is shown a cross-section of the segment of the dialysate case taken along lines 10—10 in FIG. 9, coupled with another matching segment in operating position (the dialysis capillary bundles are not shown in FIG. 10).

EXPERIMENTS ON COMPOUND MANIFOLD

A series of experiments was performed on certain configurations of the compound manifold, which consisted of a first diffuser, turning vanes, second diffuser and capillaries as shown in FIG. 7, to verify the predicted flow conditions by flow visualization techniques.

The basic manifolds each consisted of a first diffuser with an aspect ratio of 10:1 and an obstruction ratio of one-half, a transition section which contained various turning vane configurations including 10 straight vanes, 10 curved vanes, 40 straight vanes, 44 hexagonal cell vanes, and 160 circular cell vanes, and a second diffuser of square section which contained 1600 glass capillary tubes in the outflow region. The entire manifold was mounted in a fluid flow tank which allowed dye streak flow visulization and fluid distribution to be observed. Two other first diffuser models were examined. The first had an aspect ratio of 6:1 and an obstruction ratio of unity and the second had an aspect ratio of 20:1 and an obstruction ratio of one-half.

The first experiments were performed on the basic manifold without turning vanes. These were very poor fluid distribution to the outflow region of the second diffuser and a string vortex existed in the transition region between diffusers. The addition of the turning vanes improved fluid distribution and eliminated the vortex turbulence. Although ten vanes yielded good distribution, 40 vanes provided slightly more uniform performance. However, 160 vanes offered too much flow resistance and worse fluid distribution than the other van configurations. The curved turning vanes did not improve the operation of the system over ten straight vanes. It was determined that the length of the turning vanes should desirably be at least equal to the spacing between vanes in order to have completely turned and laminar fluid flow. As well, it was discovered that the first and second diffusers operated independently as changes to the configuration in one did not appreciably affect the performance of the other.

The next experiments were conducted on the other first diffuser configurations. The lateral fluid distribution (diametral plane) of the unity obstruction ratio first diffuser was not acceptable and yielded poor distribution in the second diffuser. Thus the obstruction ratio is limited to a mixture of one-half. The longitudinal fluid distribution of the 20:1 aspect ratio first diffuser showed a decrease of nearly 30% in flow velocity at the most downstream region of the outflow slot which is a significant loss but could be acceptable under certain conditions. This aspect ratio represents the maximum that could be used with a diffuser that has low outflow pressure loss.

The final experiments were conducted on an artifical kidney that was of a size acceptable for human hemodialysis. These experiments were performed on dogs for a total of six re-uses of the same unit. The artificial kidney contained 11,200 capillaries with an active length of 14 cm and a blood contacting surface of 1.16 m$^2$. The blood manifolds were machined from acrylic plastic with an inlet diameter of 5 mm and a 38 mm long first diffuser which had an aspect ratio of 15. There were 11 straight turning vanes which directed blood to the square second diffuser. The dialysate case was also machined from acrylic resin and contained and dialysate manifolds which had an inlet diameter of 6.5 mm and an aspect ratio of 40 and contained 23 turning vanes. The capillaries were potted with Silastic RTV rubber (Trade Mark) to the dialysate case and blood manifolds. The resulting blood circuit had an internal volume of 9 1.

The experimental protocol consisted of using this kidney unit on heparinized but not nephrectomized dogs which had artifically lowered hematocrits. Continuous infusion of urea and creatinine provided a constant impurity load in the animal. Heparin blood anticoagulant was infused at a rate between 1500 and 3000 U/Kg per hour. Blood pressure, flow rates and blood chemistry were monitored throughout the experiments as well as the dog body temperature. At the completion of a four-hour run, the kidney was flushed with heparinized saline and examined for blood clots in the manifolds and capillaries, then rinsed with sodium hypochlorite to remove fibrin, and filled with 3% formalin in preparation for the next experiment.

The capillaries used to construct the human-sized artificial kidney were originally designed to exhibit high ultrafiltration with low diffusional mass transfer and consequently would be expected to yield poor removal of urea and creatinine from blood. In fact, the mass transfer resistance for urea and creatinine remained constant at 300 min/cm for the first four runs and increased to 500 min/em by the sixth run. The decrease in performance was due to fibrin which deposited on the membrane surfaces.

However, the main objective of this experimental program was to evaluate the fluid mechanics of the blood circuit and not the kidney mass transfer performance. One method of determining this was to observe the degree of blood clotting by monitoring the differential pressure drop across the unit. An increase in differential pressure indicated blocking of capillaries by blood clots or fibrin deposits. Because of the variations in blood viscosity from one animal to another, it was necessary to correct the differential pressures for blood viscosity. There was no significant change in the reduced differential pressure for the first four runs and an increase of only 20% had occurred by the sixth run. Thus, there was minimal clotting of blood in the capillaries even with low maintenance dosages of heparin.

Another method for determining blood compatibility of the artifical kidney was to observe the number of clotted capillaries, fibrin and blood clots visible in the manifold, and residual blood in the kidney after a preliminary saline flush. After four separate runs, the number of clotted capillaries was about 2% of the total and appeared to be under 10%, by the end of the sixth run. There were no blood clots evident in the manifolds and only small clots and fibrin deposits on the entrance and exit surfaces to the capillaries at the end of the sixth run. It was always possible to clear blood from the unit at the end of an experimental run with the exception of residual blood in the clotted capillaries.

There was no toxic response from any of the animals throughout this experimental series as determined by continuous rectal temperature measurement. Also, there was no significant change in blood platelet count during the six runs. Thus, the experimental evidence indicates that the design objectives of the blood and dialysate distribution systems have been met.

While only representative arrangements embodying this invention have been described it should be understood that detailed of arrangement are not to be construed as limitive of the invention, except insofar as is recited in the following claims.

We claim:

1. A diffuser providing uniform diversion and diffusion with laminar flow, of liquid from a liquid supply tube having a given cross-section area to a liquid treatment face of a device in which said treatment face is of larger surface area than said supply tube;
    said diffuser comprising a first diffuser section of tube continuous with the supply tube, flow turning vanes, and a second diffuser section leading to the liquid treatment face,
    said first diffuser section having a cross-section which reduces smoothly and progressively as the liquid flow passage proceeds from an inlet of the first diffuser section to an end thereof, said first diffuser section being open on the side in a direction away from the curvature and supplying liquid in a direction perpendicular to the direction of liquid flow in the supply tube, to an inlet of the second diffuser section,
    said second diffuser section comprising a compartment having a liquid flow space, the height of said compartment perpendicular to the treatment face diminishing continuously from an inlet of said diffuser to the distal side of the second diffuser section,
    wherein a multiplicity of said flow turning vanes are associated with the interface between the first diffuser section tube and the second diffuser section compartment.

2. A diffuser as in claim 1, wherein the liquid supply tube is of circular cross-section and the liquid treatment face is the inlet area of a capillary diffusion unit having a rectangular cross-section.

3. A diffuser as in claim 2, wherein the first diffuser section has a cross-section which reduces smoothly and progressively from a circular inlet tube cross-section at the beginning of the diffuser section to a flattened semicircular cross-section at the point at which the tube ends.

4. A diffuser as in claim 1, wherein said vanes are flat plates, forming rectangular passages for fluid diversion and flow.

5. A diffuser as in claim 1, wherein said vanes are curved plates forming rectangular passages for fluid diversion and flow.

6. A diffuser as in claim 1, wherein said vanes form hexagonal passages for fluid diversion and flow.

7. A diffuser as in claim 1, wherein said vanes form circular passages for fluid diversion and flow.

8. A diffuser as in claim 1 wherein the length of said vanes is at least equal to the spacing between adjacent vanes.

9. A diffuser as in claim 1, wherein said first and second section are made of a plastic material compatible with the liquid to be treated and stable under operation conditions of the diffuser.

10. A diffuser as in claim 9, wherein said plastic material is organosilicon polymer rubber.

11. A diffuser as in claim 1, wherein the rectangular outflow opening has an aspect ratio of approximately 10 while the narrow dimension is equal to one-half the diameter of the inlet conduit.

12. A diffuser providing uniform diversion and diffusion with laminar flow, of liquid from a liquid supply tube having a predetermined cross-section area to a liquid treatment face of a device in which said treatment face is of larger surface area than said supply tube;
said diffuser comprising a first diffuser section of tube continuous with the supply tube, flow turning vanes, and a second diffuser section leading to the liquid treatment face,
said first diffuser section having a cross-section which reduces smoothly and progressively as the liquid flow passage proceeds from a circular inlet tube cross-section at the beginning of the first diffuser section to a flattened semi-circular cross-section at the point at which the tube ends, said first diffuser section being open on the side in a direction away from the curvature and supplying liquid in a direction perpendicular to the direction of liquid flow in the supply tube, to an inlet of the second diffuser section,
said second diffuser section comprising a compartment having a liquid flow space, the height of said compartment perpendicular to the treatment face diminishing continuously from an inlet of said diffuser to the distal side of the second diffuser section, wherein a multiplicity of said flow turning vanes are associated with the interface between the first diffuser section tube and the second diffuser section compartment.

13. A blood diffusion apparatus providing uniform diversion and diffusion with laminar flow, of blood from a blood supply tube having a predetermined cross-section area to a blood dialysis treatment face of a device in which said treatment face is of larger surface area than said supply tube, said apparatus including;
a diffuser comprising a first diffuser section of tube continuous with the supply tube, flow turning vanes, and a second diffuser section leading to the liquid treatment face,
said first diffuser section having a cross-section which reduces smoothly and progressively from a circular inlet tube cross-section at the beginning of the diffuser section to a flattened semicircular cross-section at the point at which the tube ends, and a rectangular outflow opening having an aspect ratio of about 10, the narrow dimension being equal to about one-half the diameter of the inlet circuit, said first diffuser section being open on the side in a direction away from the curvature and supplying blood in a direction perpendicular to the direction of blood flow in the supply tube, to an inlet of the second diffuser section,
said second diffuser section comprising a compartment having a blood flow space, the height of said compartment perpendicular to the treatment face diminishing continuously from an inlet of said diffuser to the distal side of the second diffuser section, wherein a multiplicity of said flow turning vanes are associated with the interface between the first diffuser section tube and the second diffuser section compartment.

14. A blood dialysis unit including:
a housing;
a capillary bundle having an inlet end and an outlet end;
a dialysate network associated with the housing for directing dialysate across the capillary bundle;
means for providing uniform and laminar flow of blood through a bundle free of regions of blood stagnation and separation for providing uniform pressure drops and an essentially equal blood flow rate from the capillary bundle inlet end to its outlet end and across all sectors thereof, said means including a compound manifold including a diffuser means for providing uniform blood flow distribution across the inlet and of the capillary bundle;
said diffuser including
a first section having an inlet region of small cross-section and first outflow region substantially transverse to the inlet region and having a larger cross-section than the inlet region, and a second section having a second outflow region still greater in cross-section than the first outflow region,
the sections operating to direct blood flow to the first outflow region essentially transverse of the blood flow in the inlet region and the second outflow region essentially transverse of the blood flow in the first outflow region.

15. A blood dialysis unit as claimed in claim 14 wherein the first section is provided with a circular cross-section whose area decreases linearly from the inlet region to the first outflow region and the second section is provided with a cross-section whose area decreases linearly from the first outflow region to the second outflow region.

16. A diffuser providing uniform diversion and diffusion with laminar flow, of liquid from a liquid supply tube having a given cross-section area to a liquid treatment face of a device in which said treatment face is of larger surface area than said supply tube,
said diffuser comprising a first diffuser section of tube continuous with the supply tube, flow turning vanes, and a second diffuser section having a liquid flow space and a leading to the liquid treatment face,
said first diffuser section having a cross-section which reduces smoothly and progressively as the liquid flow passage proceeds from an inlet of the first diffuser section to an end thereof, said first diffuser section being open on the side in a direction away from the curvature and supplying liquid in a direction perpendicular to the direction of liquid flow in the supply tube, to an inlet of the second diffuser section,
wherein the multiplicity of said flow turning vanes are associated with the interface between the first diffuser section tube and the second diffuser section compartment.

* * * * *